Figure 1A:
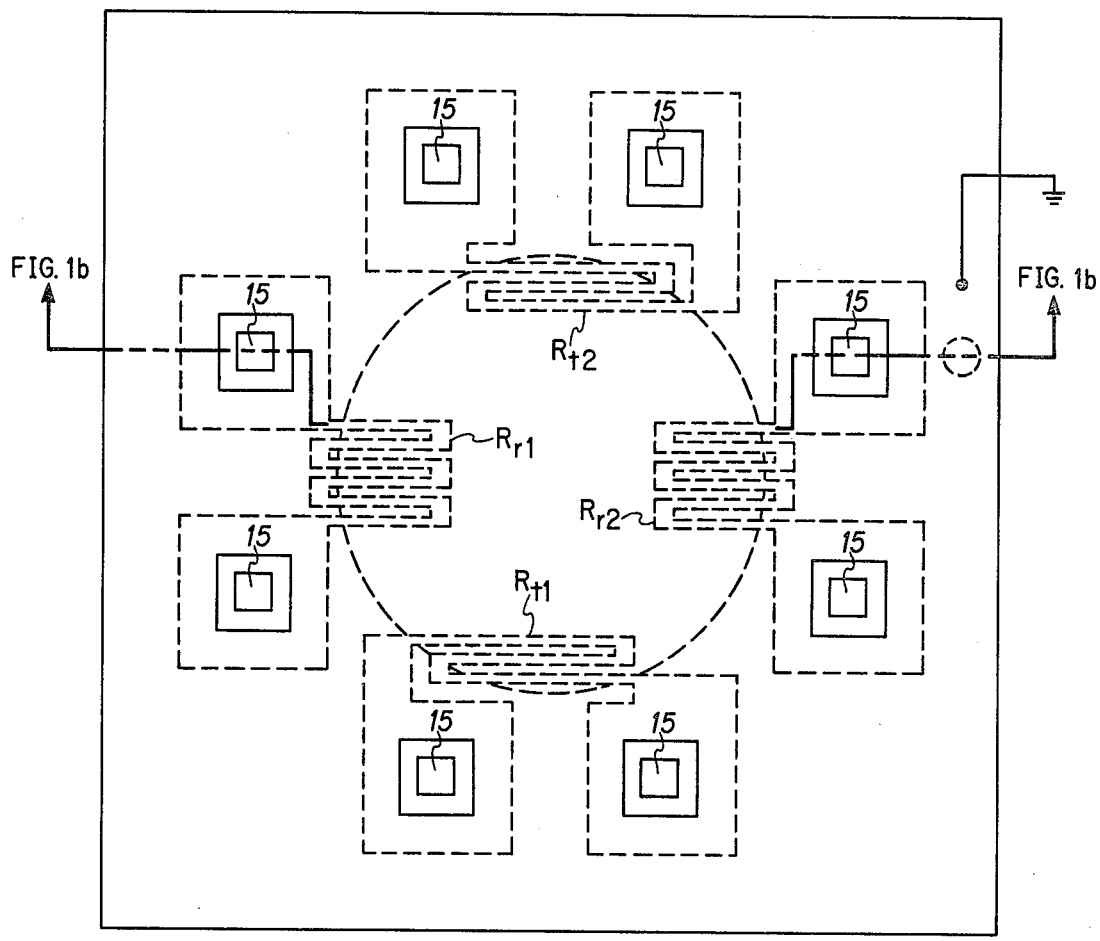

United States Patent [19]

Runyan

[11] 4,205,556
[45] Jun. 3, 1980

[54] CIRCUITRY FOR STRAIN SENSITIVE APPARATUS

[75] Inventor: Wesley G. Runyan, Cedar Rapids, Iowa

[73] Assignee: Rockwell International Corporation, El Segundo, Calif.

[21] Appl. No.: 11,251

[22] Filed: Feb. 12, 1979

[51] Int. Cl.² .............................................. G01L 9/06
[52] U.S. Cl. ........................................ 73/727; 73/721; 73/777; 324/DIG. 1; 324/65 R; 338/4
[58] Field of Search .................. 73/720, 721, 726, 727, 73/708, 777, 766, 767, 769, 141 A; 338/4, 2; 324/DIG. 1, 65 R

[56] References Cited

U.S. PATENT DOCUMENTS

| | | |
|---|---|---|
| 3,049,685 | 8/1960 | Wright, Jr. .................. 73/517 R |
| 3,456,226 | 7/1969 | Vick ........................... 73/767 |
| 3,457,493 | 7/1969 | Shoemaker et al. ............ 73/769 |
| 3,572,109 | 3/1971 | Yerman ....................... 73/141 A |
| 3,641,812 | 2/1972 | Vick ........................... 73/767 |
| 3,836,796 | 9/1974 | Solomon et al. ............... 73/766 |
| 3,841,150 | 10/1974 | Pearson ....................... 73/766 |
| 3,956,927 | 5/1976 | Person ........................ 73/766 |

Primary Examiner—Donald O. Woodiel
Attorney, Agent, or Firm—Terry M. Blackwood; Richard A. Bachand; H. Fredrick Hamann

[57] ABSTRACT

Strain gauge apparatus comprises two strain sensitive piezoresistors $R_{r1}$ and $R_{t1}$, two op-amps, three predetermined value resistances, $R_a$, $R_b$, and $R_c$, and voltage source supplying $V_{dc}$. Said elements are connected to produce an output signal of the form $V_{dc}(R_c/R_a{}_1)(R_{r1}/R_{t1}-R_a/R_b)$.

6 Claims, 5 Drawing Figures

CIRCUITRY FOR STRAIN SENSITIVE APPARATUS

This invention relates to strain sensors and associated electronic circuitry and, in the preferred application, to the semiconductor piezoresistive type of sensor and the measurement therewith of pressure.

Strain sensitive apparatus of the semiconductor piezoresistive type is well known in the art. See for instance (a) *Journal of Applied Physics*, October 1961, Vol. 32, No. 10, Pages 2008–2019 (b) U.S. Pat. No. 3,049,685 (c) U.S. Pat. No. 3,456,226 and (d) U.S. Pat. No. 3,641,812. Such devices commonly comprise a flexible silicon diaphragm in or on which a plurality of piezoresistive strain gauge elements are essentially integrally formed. The diaphragm commonly comprises crystalline silicon of one conductivity type with the strain gauge piezoresistors formed of opposite conductivity type by diffusion or other appropriate process whereby a p-n junction is achieved. With the diaphragm rigidly supported at its periphery, a transverse force applied centrally to one face causes flexure strain of the diaphragm and attendant changes in resistance of the piezoresistors. Usually at least two of the piezoresistors are arranged relative to each other on the diaphragm so that the force induced diaphragm movement causes one piezoresistor to increase in resistance while the other piezoresistor decreases in resistance. Thus when the force is due to pressure, one resistor varies directly with pressure and the other resistor varies inversely with pressure.

The problem of piezoresistance dependency on ambient temperature has also been recognized and treated by various forms of signal conditioning and temperature compensating circuitry. See for instance U.S. Pat. Nos. 3,956,927; 3,841,150; 3,836,796 and 3,457,943.

Figure 1B:
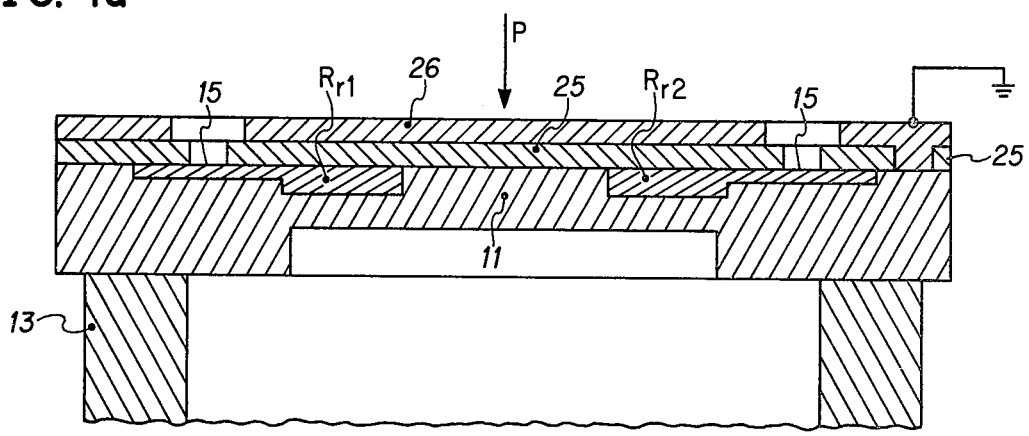
Figure 2:
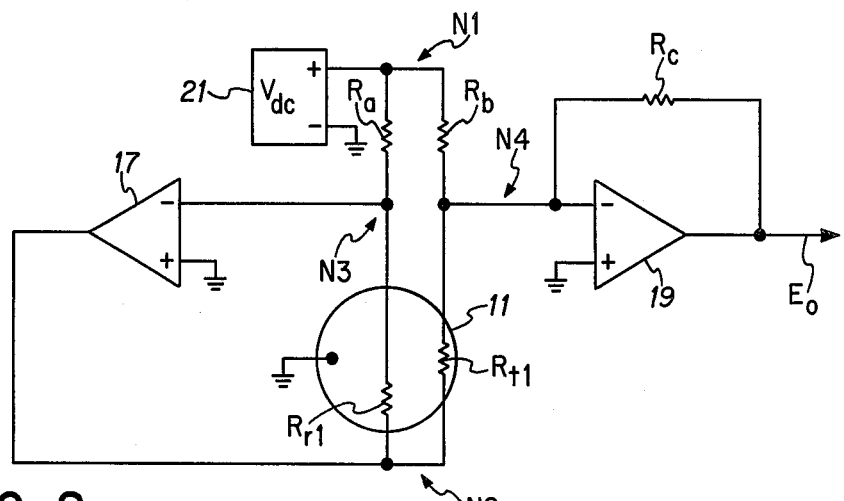
Figure 3:
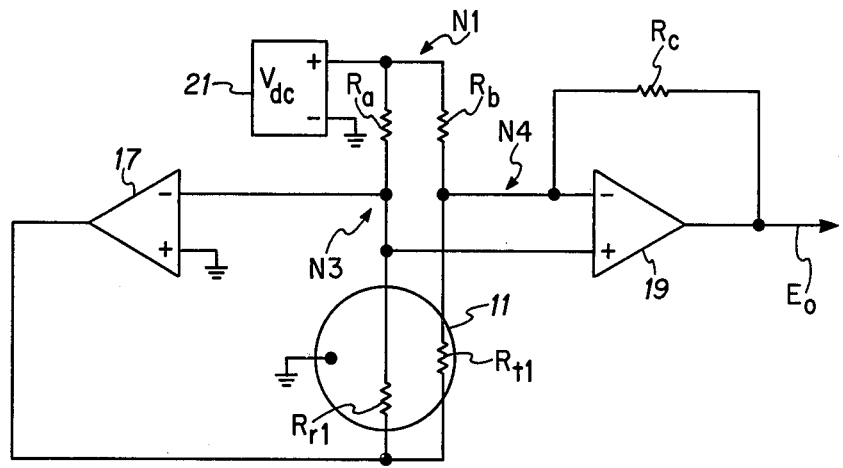
Figure 4:
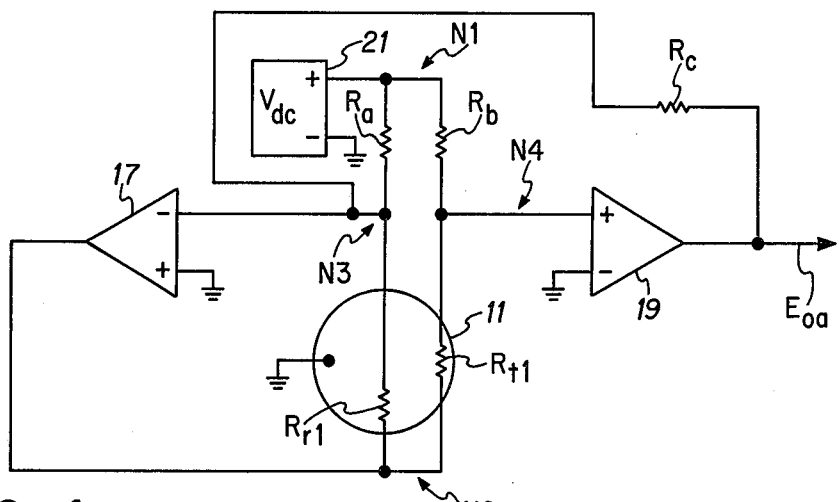

Such piezoresistive pressure sensitive devices exhibit other problems and deficiencies. For instance, the pressure signal—i.e., the change in resistance with pressure—is very weak and difficult to observe and thus sensitivity is usually poor. Also, problems of shorting and/or lack of isolation can arise due to the existence of the p-n junction between diaphragm and resistor, and also due to the presence of moisture in the environment to which the transducer is subjected. Complexity and lack of economy in number of components can also prevent practical solutions. In accordance with the present invention, these latter problems are addressed and circuits affording solution to said problems are provided. These and other features, advantages and objects of the present invention will become more apparent upon reference to the following specification, claims, and appended drawings in which:

FIGS. 1a and 1b are diagrammatic views, top and side sectional respectively, representing the presently employed piezoresistive semi-conductor pressure sensor, FIGS. 2 and 3 are circuit schematics representing presently preferred inventive embodiments, and FIG. 4 is a circuit schematic representing an alternative embodiment also in accordance with the invention.

Referring now to FIGS. 1a and 1b, there is represented a piezoresistive pressure sensor assembly employed with the present invention. In accordance with the descriptions hereinabove, a diaphragm 11 of n-type material is secured at its periphery to a tube 13. Diffused into diaphragm 11 are four piezoresistors $R_{r1}$, $R_{r2}$, $R_{t1}$, $R_{t2}$ each of p-type material. Metalized pads 15 permit wire connections to be made to said piezoresistors. An insulating layer 25 of silicon dioxide covers the entire assembly, except that holes in the insulating layer are formed to allow contact with pads 15. In addition, a guard plate layer 26 of conductive polysilicon covers the insulating layer 25, again with holes to allow contact to pads 15. These layers 25 and 26 are to protect the piezoresistors from contamination and moisture. Further reference to guard plate 26 will be made later, as this is used advantageously by the apparatus to be described. The n-type material and the conductive guard plate are connected to ground reference potential. As force or pressure P increases, the diaphragm flexes slightly and causes the resistances of said four piezoresistors to change. More particularly, the resistances of $R_{r1}$ and $R_{r2}$ increase with increasing pressure and the resistances of $R_{t1}$ and $R_{t2}$ decrease with increasing pressure.

Referring now to FIG. 2, the preferred circuitry therein illustrated comprises three predetermined and fixed resistances, namely, $R_a$, $R_b$, and $R_c$; two operational amplifiers 17 and 19; a voltage source 21; and two of the FIG. 1 piezoresistors, namely, $R_{r1}$ and $R_{t1}$. Interconnected at a first node N1 are the positive terminal of voltage source 21 and one end of each of $R_a$ and $R_b$. Piezoresistors $R_{r1}$ and $R_{t1}$ each have one end interconnected at a second node N2. At a third node N3, the other ends of $R_{r1}$ and $R_a$ are interconnected. Similarly, at a fourth node N4, the other ends of $R_{t1}$ and $R_b$ are interconnected. The inverting inputs of op-amps 17 and 19 are connected respectively to N3 and N4. The non-inverting inputs of both op-amps are connected to ground reference potential. The output of op-amp 17 is connected to node N2 and the output of op-amp 19 is coupled through feedback resistor $R_c$ to node N4.

Due to the high gain of op-amps 17 and 19, nodes N3 and N4 are maintained substantially at the reference potential, i.e., ground potential. Conventional op-amps (for instance, type LM741 with open-loop voltage gain of about 160,000) are presently employed. Feedback resistor $R_c$ serves to assure that the potential at N4 remains substantially independent of variations in piezoresistors $R_{r1}$ and $R_{t1}$. Neglecting offset errors, the output $E_o$ of the FIG. 2 circuit can be shown to be described by $E_o = V_{dc}(R_c/R_a)[(R_{r1}/R_{t1}) - (R_a/R_b)]$.

Values for $R_a$ and $R_b$ are generally chosen so that $(R_a/R_b) = (R_{r1}/R_{t1})$ at a predetermined pressure and thus so that $E_o = 0$ at said predetermined pressure. Once $R_a$ and $R_b$ are chosen, the value of $R_c$ is selected to establish the desired magnitude of the gain factor $(R_c/R_a)$.

From the form of $E_o$, it is apparent that sensitivity is improved relative to the sensitivity obtainable from observing a single piezoresistor. More particularly, $E_o$ varies as a function of the ratio $(R_{r1}/R_{t1})$ and, as mentioned hereinabove, $R_{r1}$ increases with increasing pressure and $R_{t1}$ decreases with increasing pressure. Thus, the ratio increases with pressure due to both an increasing numerator and a simultaneously decreasing denominator.

In addition to good sensitivity, the apparatus of FIG. 2 provides a biasing arrangement of the piezoresistors which is advantageous in several respects. First, since node N3 is constantly maintained at very nearly ground potential, and since all other points along $R_{r1}$ are more negative than N3, the p-n junction between $R_{r1}$ and the diaphragm cannot become forward biased when the diaphragm is connected to ground potential as previously represented herein. Current through the p-n junction will then be limited to very small reverse leakage currents, which will be conducted to ground without affecting $R_{t2}$. Moreover, if this p-n junction leakage current occurs near the end of $R_{r1}$ which is connected to node N2, such leakage current will appear only as a load to ground for op-amp 17, and, as such, will cause no error in output $E_o$. This advantageous response to p-n junction leakage current will diminish for leakage currents nearer to node N3, but the over-all average response to such currents remains substantially improved as compared with the response by various alternative curcuits. Similar statements can be made regarding the leakage currents of the p-n junction between $R_{t1}$ and the diaphragm.

A second advantage of the biasing provided by the apparatus of FIG. 2 is that, with both the diaphragm and one end of each piezoresistor at ground potential, the maximum reverse voltage that can appear across any portion of any p-n junction is only the IR voltage drop of one piezoresistor. This is clearly a practical minimum of applied reverse voltage, thus minimizing the probability of reverse voltage break-down of the p-n junctions.

A third advantage of the biasing provided by the apparatus of FIG. 2 is its effective utilization of the conductive guard plate 26. With this guard plate, all connection pads 15 are surrounded by conductive material at ground potential. With the entire assembly, including pads 15, necessarily exposed to the pressure media, it is likely that moisture or other contaminants in the pressure media will occasionally form resistive bridges between the pads and the pad surroundings. However, the presence of the guard plate ensures that such resistive bridging will be from pads to ground, as it is extremely unlikely that a bridge could develop from pad to pad without contacting the grounded guard plate in between. In the apparatus of FIG. 2, all piezoresistor connection pads are either very near to ground potential or are connected to the output of op-amp 17. Bridging to ground of pads at ground potential cannot cause errors because there is no voltage across, and hence no current through, such bridges. Bridging to ground at op-amp outputs serves merely to load the op-amps, which supply such loading without causing errors unless the bridging resistance is very low. Thus it can be appreciated that the apparatus of FIG. 2 effectively utilizes the conductive guard plate 26 such as to achieve relative immunity to the occurance of errors as a result of moisture and contamination bridging.

Turning now to FIG. 3, the embodiment therein illustrated differs from the FIG. 2 embodiment only in that the non-inverting input of op-amp 19 is connected to node N3 instead of the ground reference potential. The circuits of FIGS. 2 and 3 perform identically except that the FIG. 3 version is affected less by op-amp input offset errors. The output of the FIG. 3 circuit is also described by the equation hereinabove for $F_o$.

The alternative embodiment illustrated in FIG. 4 is substantially the same as the embodiment illustrated in FIG. 2, the only differences being (i) that the output of op-amp 19 is connected through feedback resistor $R_c$ to node N3 instead of node N4 and (ii) that the inputs to op-amp 19 are reversed relative to the FIG. 2 embodiment. The output $E_{oa}$ of the FIG. 4 embodiment may be described as follows $E_{oa}=V_{dc}(R_c/R_b)[(R_{t1}/R_{r1})-(R_b/R_a)]$. Also, in the FIG. 4 embodiment, the inverting input shown connected to ground reference potential may instead be connected to node N3.

Other variations of the FIG. 2 embodiment are of course within the scope of the present invention. For instance the circuit locations of $R_{r1}$ and $R_{t1}$ may be reversed so that $R_{r1}$ connects to node N4 (instead of N3) and $R_{t1}$ connects to node N3 (instead of N4). Also, a reference potential other than ground potential may be used.

Thus, while particular embodiments of the present invention have been shown and/or described, it is apparent that changes and modifications may be made therein without departing from the invention in its broader aspects. The aim of the appended claims, therefore, is to cover all such changes and modifications as fall within the true spirit and scope of the invention.

What is claimed is:

1. Strain gauge apparatus comprising:
   (a) first and second resistance means $R_w$ and $R_x$ connected together at one end to form a node $N_a$,
   (b) first and second strain sensitive resistance means $R_y$ and $R_z$ which vary in opposite directions with variation in strain, $R_y$ and $R_z$ being connected together at one end to form a node $N_b$,
   the unused ends of $R_w$ and $R_y$ being connected together to form a node $N_c$, and the unused ends of $R_x$ and $R_z$ being connected together to form a node $N_d$,
   (c) supply means connected for establishing a predetermined voltage $V_s$ at $N_a$,
   (d) first operational amplifier (op-amp) means having inverting and non-inverting input means and output means, a predetermined one of said first op-amp input means being connected to a predetermined reference potential $V_R$, and the other of said first op-amp input means being connected to $N_c$,
   (e) means for providing to $N_b$ a signal indicative of said first op-amp output,
   (f) second operational amplifier (op-amp) means having inverting and non-inverting input means and an output means, a predetermined one of said second op-amp input means being connected to $N_d$ and the other of said second op-amp input means being connected to a predetermined one of (i) $N_c$ or (ii) the predetermined reference potential $V_R$, and
   (g) feedback means connected to the output means of said second op-amp for feeding back to a predetermined one of $N_c$ or $N_d$ a signal which assures that the potential at $N_d$ remains substantially independent of variations in said strain sensitive resistance means.

2. Apparatus as defined in claim 1 wherein said first and second strain sensitive resistance means comprise semiconductor material of either the p or n-type carried by diaphragm means comprising semiconductor material of the other type, said diaphragm means being connected to $V_R$.

3. Apparatus as defined in claim 2 wherein the polarity of $V_s$ relative to $V_R$ is appropriate to avoid a forward current flow through the p-n junction between said diaphragm means and said strain sensitive resistance means.

4. Apparatus as defined in claim 2 wherein said strain sensitive resistance means comprise p-type material, said diaphragm means comprises n-type material, and $V_s$ is more positive than $V_R$.

5. Apparatus as defined in claim 1 wherein said feedback means comprises resistance means of predetermined value.

6. Apparatus as defined in claim 1 wherein said means for providing to $N_b$ a signal indicative of said first op-amp output comprises means for connecting said first op-amp output means to $N_b$.

* * * * *